(12) United States Patent
Petersen et al.

(10) Patent No.: US 10,327,450 B2
(45) Date of Patent: Jun. 25, 2019

(54) METHOD OF CREATING BATCHES FOR FOOD ITEMS CONVEYED BY A CONVEYOR

(71) Applicant: MAREL A/S, Aarhus N (DK)

(72) Inventors: Steen Karlskov Petersen, Hinnerup (DK); Birgit Mortensen, Beder (DK); Jesper Ågård Vuholm, Hadsten (DK)

(73) Assignee: MAREL A/S, Aarhus N (DE)

( * ) Notice: Subject to any disclaimer, the term of this patent is extended or adjusted under 35 U.S.C. 154(b) by 0 days.

(21) Appl. No.: 15/503,043

(22) PCT Filed: Aug. 13, 2015

(86) PCT No.: PCT/DK2015/050235
§ 371 (c)(1),
(2) Date: Feb. 10, 2017

(87) PCT Pub. No.: WO2016/023557
PCT Pub. Date: Feb. 18, 2016

(65) Prior Publication Data
US 2017/0245509 A1    Aug. 31, 2017

(30) Foreign Application Priority Data

Aug. 13, 2014  (DK) ............................ PA 2014 70482

(51) Int. Cl.
*B07C 5/36*  (2006.01)
*B07C 5/38*  (2006.01)
(Continued)

(52) U.S. Cl.
CPC ........ *A22C 17/008* (2013.01); *A22C 17/0086* (2013.01); *B07C 5/342* (2013.01);
(Continued)

(58) Field of Classification Search
CPC . A22C 17/008; A22C 17/0086; A22C 17/002; B07C 5/38; B07C 5/342; B65B 25/061
(Continued)

(56) References Cited

U.S. PATENT DOCUMENTS 6,533,125 B1 *  3/2003  Jensen ................. G01G 19/303
                                                198/370.02
8,869,990 B2 *  10/2014  Skyum ................. A22C 17/008
                                                209/645
(Continued)

FOREIGN PATENT DOCUMENTS

DE   102005047796 A1   4/2007
WO     2008093364 A1   8/2008

OTHER PUBLICATIONS

International Search Report for corresponding International PCT Application PCT/DK2015/050235, dated Nov. 19, 2015.

*Primary Examiner* — Isiaka O Akanbi
(74) *Attorney, Agent, or Firm* — Workman Nydegger

(57) ABSTRACT

A method of creating batches for food items conveyed by a conveyor means, comprises measuring an image profile for a food item, processing the measured image profile for the food item, cutting the food item into a plurality of portions based on the processed measured image profile, and distinguishing the portions within the partial batch from the remaining portions. The number of portions from one or more of subsequent food items needed to complete the partial batch is such that it fulfills the pre-defined batch-criteria taken from the same or similar area of the food items from where the partial batch originates.

20 Claims, 2 Drawing Sheets

(51) Int. Cl.
*B07C 5/34* (2006.01)
*A22C 17/00* (2006.01)
*B07C 5/342* (2006.01)
*B65B 25/06* (2006.01)

(52) U.S. Cl.
CPC .............. *B07C 5/38* (2013.01); *A22C 17/002* (2013.01); *A22C 17/0006* (2013.01); *A22C 17/0073* (2013.01); *A22C 17/0093* (2013.01); *B07C 5/34* (2013.01); *B07C 5/36* (2013.01); *B65B 25/06* (2013.01); *B65B 25/061* (2013.01); *B65B 25/065* (2013.01)

(58) Field of Classification Search
USPC .................................................. 356/600–625
See application file for complete search history.

(56) References Cited

U.S. PATENT DOCUMENTS

| | | | |
|---|---|---|---|
| 9,159,126 B2 * | 10/2015 | Johnson | A22C 17/008 |
| 2001/0007499 A1 * | 7/2001 | Richert | G01N 21/8901 |
| | | | 356/402 |
| 2004/0146602 A1 * | 7/2004 | Garwood | A23B 4/16 |
| | | | 426/35 |
| 2005/0137744 A1 * | 6/2005 | Winkelmolen | B07C 5/16 |
| | | | 700/223 |
| 2009/0223878 A1 * | 9/2009 | Grundtvig | B65B 5/105 |
| | | | 209/617 |
| 2010/0282833 A1 | 11/2010 | Thorsson et al. | |
| 2010/0292828 A1 * | 11/2010 | Einarsson | B07C 5/38 |
| | | | 700/114 |
| 2012/0055760 A1 | 3/2012 | Viglundsson et al. | |
| 2016/0001328 A1 * | 1/2016 | Hermle | B07C 5/363 |
| | | | 209/577 |

* cited by examiner

METHOD OF CREATING BATCHES FOR FOOD ITEMS CONVEYED BY A CONVEYOR

FIELD OF THE INVENTION

The present invention relates to a method of creating batches for food items conveyed by a conveyor means.

BACKGROUND OF THE INVENTION

In the food industry, pieces of food are often packaged together in a single pack that forms a batch. An example of such a food product is a fish fillet such as salmon and where the pack may contain e.g. four slices of fish fillet pieces. Another example is where the food product is a pork loin and where the pack may contain a certain number of pork loin pieces. In both cases the pieces typically must fulfil a pre-defined target, e.g. have a pre-defined target weight or e.g. have a fixed number of pieces that may have similar thickness.

Several devices have in the recent years been developed to automatically create such batches where no manual labour is needed. An example of such a device is disclosed in WO2008093364, where it is among other things disclosed to create batches of pork loin, where e.g. three slices of meat are put in a tray. The pork loin is put into a portioning machine that slices the pork loin into equal portions that are released onto a conveyor, where that after receiving each slice the conveyor advances slightly so that the next slice will only partly overlap the previous slice. After three slices of meat have been cut and released on the conveyor, i.e. after completing the batch, the slices are moved away and the subsequent batch begins and the process is repeated.

In case a full batch cannot be completed because the portioning machine has reached the end part of the pork loin, a partial batch is created, e.g. only two slices of meat instead of three, and this batch is moved away as a partial batch. This partial batch is then completed by adding the first meat slice (since only one meat slice was missing) from the subsequent pork loin to this partial batch.

Various means may be provided for enabling such a partial batch creation and for completing the partial batch, e.g. by using retractable conveyor means, and for enabling placing the batches into trays.

Prior art devices have in common that such partial batches are completed by adding pieces of items from the next subsequent items so as to complete the partial batch before the next batch creation starts.

This can have several disadvantages, such as the fact that the portions in the batch originate from different primal parts that may have slightly different colour and/or shape which may affect the appearance of the batch towards the customer and thus reduce the value of the batch.

SUMMARY OF THE INVENTION

On the above background it is an object of embodiments of the present invention to provide a method of creating batches where the visual appearance of the batches is improved and thus the value of the batch.

Embodiments of the invention preferably seeks to mitigate, alleviate or eliminate one or more of the above mentioned disadvantages singly or in any combination. In particular, it may be seen as an object of embodiments of the present invention to provide a method that solves the above mentioned problems, or other problems, of the prior art.

To address one or more of these concerns, in a first aspect of the invention a method is provided of creating batches for food items conveyed by a conveyor means, comprising:
  measuring an image profile for a food item,
  processing the measured image profile for the food item, where the processing includes:
    dividing the image profile of the food item into at least one batch fulfilling a pre-defined batch-criteria, where each of the at least one batch includes two or more portions each of which fulfil a pre-defined portion-criteria,
    determining whether there is a partial batch that does not fulfill the pre-defined batch-criteria, where in case a partial batch is present, determining and registering the number of portions within the partial batch that fulfil the pre-defined portion-criteria,
    selecting an area within the food item where the partial batch originates from, or—in other words—, selecting an area within the food item as origination for the number of portions for the partial batch,
  cutting the food item into a plurality of portions based on the processed measured image profile,
  distinguishing the portions within the partial batch from the remaining portions,
wherein the number of portions from one or more of subsequent food items needed to complete the partial batch such that it fulfils the pre-defined batch-criteria is taken from the same or similar area of the food items as where the partial batch originates from.

The step of determining whether there is a partial batch that does not fulfill the pre-defined batch-criteria may comprise determining if the number of portions that can be cut from the food item, where each portion fulfils the pre-defined portion-criteria, does or does not match a whole number of batches that fulfils the pre-defined batch-criteria. In case the number of portions does not match a whole number of batches, the excess portions can be called a partial batch or just called portions.

The step of selecting an area within the food item where the partial batch originates from, e.g. a center part of a fish fillet, in combination of completing the batch with one or more portions from the same or similar area, i.e. the center part of the subsequent fish fillet(s), it is ensured that the appearance of the portions within a tray will look similar and appear as if they originate from the same food item. This is especially relevant when the food items have irregular shape such as fish fillets, where e.g. instead of making a batch having a portion from the tail part side and the neck part side, the batch will contain portions having similar shape, e.g. the tail side, the neck side, or at the center part.

As an example, if the food items are salmon fillets, the method may be operated in such a way that e.g. the partial batches are taken from a middle section of the salmon fillets, and where the food portions needed to complete the partial batch is/are also taken from a middle section of the subsequent salmon fillet(s). The tail part side and the neck part side of the fish fillet(s) would then however then be the sides that are in a way reserved for generating batches that fulfil the pre-defined batch-criteria.

The step of selecting an area within the food item where the partial batch originates from, or in other words, the step of selecting an area within the food item as origination for the number of portions for the partial batch, may comprise that one or more portions may be identified or selected to be the partial batch. Also, in case the partial batch comprises two or more portions, these may originate from one and the same area or they may originate from separate areas of the food item.

In one embodiment, the step of selecting an area within the food item where the partial batch originates from, or—in other words—, the step of selecting an area within the food item as origination for the number of portions for the partial batch, may comprise selecting said area within a predetermined area of the food item. Thus, as mentioned above, the predetermined area of the food item may be a middle section of food item, e.g. a salmon fillet, and the one or more portions making up the partial batch is/are selected from this area. This predetermined area may have been determined for the processing of a particular type of food items, for the processing of a particular customer order, for the processing of a particular batch of food items, etc.

In one embodiment, the step of selecting an area within the food item where the partial batch originates from, or—in other words—, the step of selecting an area within the food item as origination for the number of portions for the partial batch, may comprise dynamically selecting an area, based on e.g. the image profile of said food item, e.g. one or more image profiles of previously processed food items, etc. Thus, for example in case of salmon fillets it may be envisaged that a relatively large salmon fillet is processed and where the one or more portions may be selected to be taken from an area nearer the neck or tail part, since it will be easier to select portions from subsequent salmon fillets to complete the batch, which will have a similar size and/or appearance so that the portions within the completed batch, e.g. placed in a tray will look and appear as if they originate from the same salmon fillet. Other examples, where the area from which the portion(s) of the partial batch is selected dynamically, e.g. based on knowledge of image profiles of previously processed food items, are for example food items, where other portion-criteria is/are concerned, e.g. in case it is the appearance, for example color, fat/meat relationship, etc., of the portions that are of importance and where the area is selected to be an area of the food item, which has an appearance similar to the most common appearance of the previously processed food items, since it may be expected that the subsequent food items will be similar in appearance, thus making it easier to complete a batch having a relatively homogeneous appearance.

The step of distinguishing the portions within the partial batch from the remaining portions, e.g. by distinguishing the partial batch from the batches that fulfil the pre-defined batch-criteria or by distinguishing the portions in the partial batch from the remaining portions cut from the food item, may facilitate the further handling of the batches, partial as well as completed. The batches and/or the portions in the batches may be registered as regards the positions on the conveyor means, allowing handling, moving, positioning, etc. of the partial and/or the completed batches and/or the portions comprised in these.

In one embodiment, the number of portions from one or more subsequent food items needed to complete the partial batch is from food items having a partial batch that does not fulfill the pre-defined batch-criteria. Thus, only in case there is a partial batch present that does not fulfill the pre-defined batch-criteria the portion(s) within the partial batch will contribute in completing the partial batch. This means that one or more of the subsequent food items may not contribute in completing that partial batch because these food items fulfill the pre-defined batch-criteria.

In one embodiment, the pre-defined batch-criteria includes a batch-weight target.

In one embodiment, the pre-defined portion-criteria includes a portion-weight.

In one embodiment, the pre-defined batch-criteria includes a number of portions.

In one embodiment, the pre-defined portion-criteria includes a thickness of the portions. Thus, in case of fish fillets the pre-defined portion-criteria may include a thickness of the fish fillet, in case of e.g. pork, loin or beef items the pre-defined portion-criteria may include a thickness of the slices of the food items, etc.

In one embodiment, the pre-defined portion-criteria includes a color of the portions.

According to further embodiments, the pre-defined portion-criteria may include a fat/meat relationship of the portions, a texture of the surface of the portions and/or other characteristics of the portions, which may have been measured in connection with the measuring of the image profile or measured otherwise.

As an example, if the food products is salmon fillet (it may of course be any type of food product) and where the pre-defined batch-criteria is to make four 100 g salmon pieces, i.e. the pre-defined batch-criteria four slices of 100 g so that the complete batch weighs 400 g batch, and if the total weight of the subsequent fillet is 1600 g, there will be no partial batch present that does not fulfill the pre-defined batch-criteria. The same applies if the next salmon fillet weighs 2000 g because five batches may be produced. However, if the third subsequent salmon fillet weighs 1800 g, there will be two 100 g portions that may contribute in completing the partial batch. In case only one 100 g slice is needed to complete the partial batch, only one of these two slices will be used, and the other 100 g slice will define the next partial batch.

As mentioned here above, a further or additional criteria could e.g. be that the colour of the portions in the partial batch are similar or identical to the portions, e.g. within a pre-defined colour range.

In another embodiment, the number of portions from one or more subsequent food items needed to complete the partial batch is from the next food item irrespective of whether there is a partial batch present that does not fulfill the pre-defined batch-criteria or not.

In one embodiment, the step of distinguishing the portions within the partial batch from the remaining portions comprises separating the portions within the partial batch from the remaining portions.

In one embodiment, the step of distinguishing the portions within the partial batch from the remaining portions, e.g. distinguishing the partial batch from the batches that fulfil the pre-defined batch criteria, may comprise registering e.g. the positions on the conveyor means by tracking devices, e.g. by marking devices including for example electronic, electromagnetic devices, etc. whereby the further handling of the batches, including the partial batches and/or the portions in these may be facilitated by use of for example robotic handling and/or gripping means.

In one embodiment, the step of distinguishing the portions within the partial batch from the remaining portions comprises creating a spacing between the partial batch and the remaining batches, i.e. the batches that fulfil the pre-defined batch-criteria, e.g. such that it is possible to visually distinguishing the partial batch from the remaining batches. This could be an advantage where e.g. the separation is a manual process where an operator can easily distinguish visually the partial batch from the remaining batches simply. All types of devices may be used, e.g. a conveyor system or a robotic system, where such a separation may be of an advantage, e.g. the robotic system may visually recognize which part is a partial batch and which is not, and/or the spacing may facilitate the separation of the partial batch from the remaining batches.

In one embodiment, the method further comprises creating a spacing between the batches that fulfil the pre-defined batch-criteria. This spacing is preferably different from the spacing between the partial batches so as to indicate visually which parts are batches that fulfil the pre-defined batch-criteria and which one are not. As an example, there could be a 5 mm space between portions within the batches whereas there could be a 10 mm space between the batches and the partial batches.

Other visual distinguishing means may be used for distinguishing the partial batch from a batch that fulfils the pre-defined batch-criteria and/or for distinguishing the portions in the partial batch from the remaining portions of the food item, such as for example markers, light beams, etc.

In a second aspect of the invention, a computer program product is provided comprising computer readable instructions for carrying out the above mentioned method steps when the computer program is executed on a suitable computer device.

In a third aspect of the invention, an apparatus is provided adapted for creating batches for food items conveyed by a conveyor means, comprising:
  measuring means for measuring an image profile for a food item,
  a processor for processing the measured image profile for the food item, where the processing includes:
    dividing the image profile of the food item into at least one batch fulfilling a pre-defined batch-criteria, where each of the at least one batch includes two or more portions each of which fulfil a pre-defined portion-criteria,
    determining whether there is a partial batch that does not fulfill the pre-defined batch-criteria, where in case a partial batch is present, determining and registering the number of portions within the partial batch that fulfil the pre-defined portion-criteria,
    selecting an area within the food item where the partial batch originates from, or—in other words—, selecting an area within the food item as origination for the number of portions for the partial batch,
  a cutting device for cutting the food item into a plurality of portions based on the processed measured image profile,
  means for distinguishing the portions within the partial batch from the remaining portions,
  wherein the number of portions from one or more of subsequent food items needed to complete the partial batch such that it fulfils the pre-defined batch-criteria is taken from the same or similar area of the food items as where the partial batch originates from.

In one embodiment, the means for distinguishing the portions within the partial batch from the remaining portions, e.g. distinguishing the partial batch from the batches that fulfil the pre-defined batch criteria, may comprise visual as well as non-visual means for registering e.g. the positions on the conveyor means by tracking devices, e.g. by marking devices including for example electronic, electromagnetic devices, etc. whereby the further handling of the batches, including the partial batches and/or the portions in these may be facilitated by use of for example robotic handling and/or gripping means.

In one embodiment, the means for distinguishing the portions within the partial batch from the remaining portions comprises a separator device adapted to separate the portions within the partial batch from the remaining portions.

In one embodiment, the step of distinguishing the portions within the partial batch from the remaining portions comprises spacing means adapted to create a space between the partial batch from the remaining batches so as to visually distinguishing the partial batch from the remaining batches.

Other visual distinguishing means may be used for distinguishing the partial batch from a batch that fulfils the pre-defined batch-criteria and/or for distinguishing the portions in the partial batch from the remaining portions of the food item, such as for example markers, light beams, etc.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
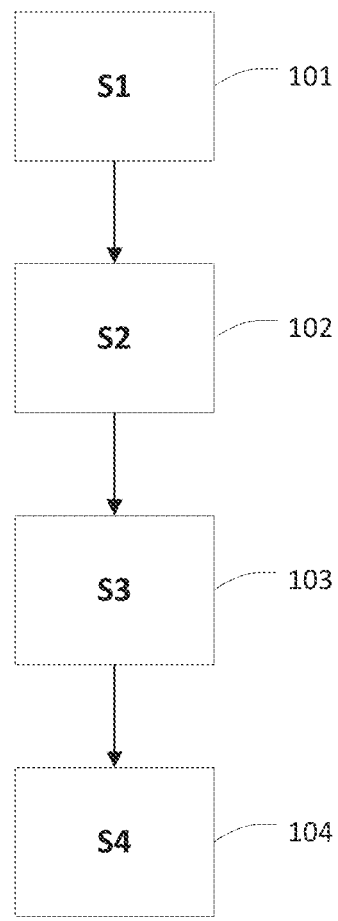
FIG. 1 shows a flow diagram of a method according to the present invention of creating batches for food items conveyed by a conveyor means.

FIG. 1 shows a flow diagram of a method according to the present invention of creating batches for food items conveyed by a conveyor means.

In step S1 (101), an image profile is measured for a food item. The food item may be of any type, such as, but not limited to, any type of loin, fish fillet etc.

In step S2 (102), the measured image profile of the food item is processed, where the processing includes dividing the image profile of the food item into at least one batch fulfilling a pre-defined batch-criteria.

The pre-defined batch-criteria may include a batch-weight target and/or include a number of portions, e.g. four numbers of portions within a given batch.

Further, each of the at least one batch includes two or more portions which fulfil a pre-defined portion-criteria. The pre-defined portion-criteria may include a fixed weight, e.g. 100 g meat slice, and/or a colour of the portions and/or the thickness of the portions.

The processing further includes determining whether there is a partial batch present that does not fulfill the pre-defined batch-criteria, where in case a partial batch is present, determining and registering the number of portions within the partial batch that fulfil the pre-defined portion-criteria and selecting an area within the food item where the partial batch originates from. Accordingly, the partial batch is not randomly selected, e.g. at the end of the food item, but a certain area may be assigned for the partial batch.

In step S3 (103), the food item is cut into a plurality of portions based on the processed measured image profile.

In step S4 (104), the portions within the partial batch are distinguished from the remaining portions, wherein the number of portions from one or more of subsequent food items needed to complete the partial batch such that it fulfils the pre-defined batch-criteria is taken from the same or similar area of the food items as where the partial batch originates from.

In one embodiment, the number of portions from one or more subsequent food items needed to complete the partial batch is from food items having a partial batch that does not fulfill the pre-defined batch-criteria. This means that if e.g. the next subsequent food item may be divided into x number of batches that all fulfill the pre-defined batch criteria, e.g. four slices each weighing 100 g so that the batch is 400 g, then there will not be any partial batch and therefore this subsequent food item will not contribute in completing the partial batch. This may also apply to the second next food item etc. where no partial batch is present.

In another embodiment, the partial batch is completed from the one or more subsequent items, irrespective of whether the one or more next subsequent food items have a partial batch present that that does not fulfill the pre-defined batch-criteria or not. Referring to the example above, the next subsequent item where no partial batch that does not fulfill the pre-defined batch-criteria is present, one or more portions will still be cut from the food item within the same area to be added to the partial batch. This will then leave a partial batch that will be completed with one or more of the subsequent food items.

In one embodiment, the step of distinguishing the portions within the partial batch from the remaining portions comprises creating a spacing between the partial batch from the remaining batches for visually distinguishing the partial batch from the remaining batches. This may be done in various ways, e.g. by means of using spacing conveyors placed adjacent to each other where the speed of a conveyor placed downstream to the other conveyor is temporarily increased, and then decreased down to the same speed as the upstream conveyor. Also, this may facilitate separating the partial batch that does not fulfill the pre-defined batch-criteria from the remaining batches within the same food item.

In one embodiment, the spacing may also be created between the batches that fulfil the pre-defined batch-criteria, where this spacing may be different from the spacing for the batch that does not fulfill the pre-defined batch-criteria. As an example, referring to the example above, the spacing between the four portions within each batch may be 1 cm whereas the spacing between the batches that fulfill the pre-defined batch-criteria and the batch that does not fulfill the pre-defined batch-criteria may be 2 cm. This distance measure should of course not be construed to this 1 cm and 2 cm, but any distance measure may be utilized.

Figure 2:
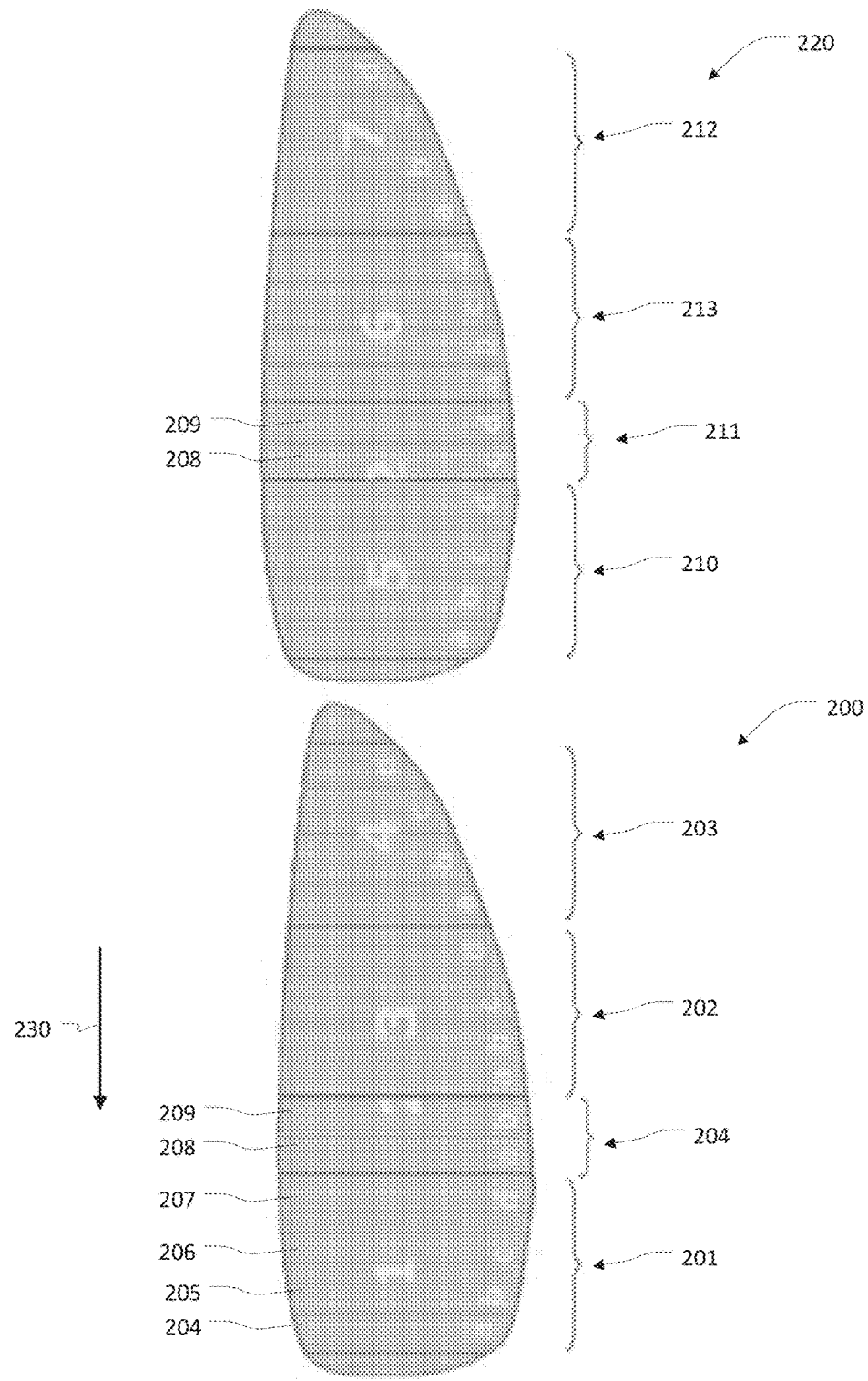
FIG. 2 depicts graphically an example of implementing the method according to the present invention and as discussed in relation to FIG. 1.

FIG. 2 depicts graphically an example of implementing the method according to the present invention and as discussed in relation to FIG. 1, where the food items are fish fillets, e.g. salmon fish fillets.

Shown are two fish fillets 200, 220 that are being conveyed in a conveying direction as indicated by arrow 230. The image profile of the fish fillet 200 shown here indicates that there are three batches 201-203 that fulfil a pre-defined batch criterion. The batch criterion may e.g. be that the number of portions within the batch is four 204-207, and where the pre-defined portions criteria may be that they are of the same or similar thicknesses (as discussed previously, the portion criteria may just as well be the weight of the portions, colour etc.).

In fish fillet 200, it is not possible to form four batches of four portions, because the partial batch in the middle area 204 of the fish fillet constitutes of only two portions 208, 209, i.e. two portions are needed to complete this batch. These portions however do fulfil the pre-defined portion criteria, e.g. have the correct thickness (or weight, colour etc.).

In this case, the middle area is assigned as the area where the partial batches originate from, but this area could just as well be the tail part of the fish fillets or the neck part/side.

The subsequent fish fillet 220 positioned at the upstream side also has three batches 210, 212 and 213 that fulfil the above mentioned pre-defined batch criteria, whereas within the same area 211 in between these three batches and within the same area as in fish fillet 200, there is a partial batch with two portions that cannot make up a full complete batch since two portions are missing. Accordingly, the two portions in fish fillet 220 can be utilized to complete the partial batch 204.

These fish fillets 200, 220 are cut into these portions as indicated here, where any type of computer controlled cutter may be used that instructs the cutting means to cut according to this pattern.

Subsequently the partial batch 204 may be separated from the fish fillet 200, and partial batch 211 may be separated from fish fillet 220. A combiner, e.g. a robotic arm, conveyor system or an operator, subsequently combine the partial batch 211 with the partial batch 204 and thus complete the batch of four portions.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method of creating batches for food items conveyed by a conveyor, comprising:
    obtaining a visual image of a food item with an image sensor,
    storing said obtained visual image,
    measuring the obtained and stored visual image to obtain a measured image profile for the food item,
    processing the measured image profile for the food item, wherein the processing includes:
        dividing the measured image profile of the food item into at least one batch fulfilling a pre-defined batch-criteria, wherein each of the at least one batch includes two or more portions, each of which fulfil a pre-defined portion-criteria,
        determining, based on said obtained and stored visual image, whether said dividing would yield a partial batch that does not fulfill the pre-defined batch-criteria, wherein in case a partial batch would be yielded from said dividing, determining and registering the number of portions within the partial batch that will fulfil the pre-defined portion-criteria, and
        selecting an area within the food item where the partial batch would originate from based on the obtained and stored visual image,
    cutting the food item into a plurality of portions based on the processed measured image profile, distinguishing the portions within the partial batch from the remaining portions, wherein the number of portions from one or more of subsequent food items needed to complete the partial batch such that it fulfils the pre-defined batch-criteria is taken from a corresponding same or similar area of the one or more of subsequent food items as where the partial batch originates from.

2. The method according to claim 1, wherein the step of selecting an area within the food item where the partial batch originates from comprises selecting said area within a pre-determined area of the food item.

3. The method according to claim 1, wherein the step of selecting an area within the food item where the partial batch originates from comprises dynamically selecting an area, based on the image profile of said food item.

4. The method according to claim 1, wherein the number of portions from one or more subsequent food items needed to complete the partial batch is from food items having a partial batch that does not fulfill the pre-defined batch-criteria.

5. The method according to claim 1, wherein the pre-defined batch-criteria includes
a batch-weight target and/or
a number of portions.

6. The method according to claim 1, wherein the pre-defined portion-criteria includes at least one of:
a portion-weight,
a thickness of the portions, and
a color of the portions.

7. The method according to claim 1, wherein the step of distinguishing the portions within the partial batch from the remaining portions comprises creating a spacing between the partial batch from the remaining batches so as to visually distinguish the partial batch from the remaining batches.

8. The method according to claim 1, further comprising creating a spacing between the batches that fulfil the pre-defined batch-criteria.

9. The method according to claim 1, wherein the step of distinguishing the portions within the partial batch from the remaining portions comprises separating the portions within the partial batch from the remaining portions.

10. The method according to claim 1, wherein dividing the obtained image profile includes dividing the obtained image profile into at least a first portion obtained from a first end of the food item and a last portion obtained from a last end of the food item.

11. The method according to claim 10, wherein the area selected in said processing of the measured image profile where the partial batch would originate from is located between the first portion of the food item and the last portion of the food item.

12. The method according to claim 1, further comprising forming a first batch that includes first portions of the cut food item, wherein said first batch of said first portions fulfills said pre-defined batch criteria upon which said dividing of the measured image profile was based.

13. The method according to claim 12, further comprising forming a second batch that fulfills the pre-defined batch criteria, wherein the second batch includes second portions of the cut food item, the second portions of the cut food item corresponding to portions of the cut food item of the partial batch that do not fulfil said pre-defined batch criteria, and
wherein said second batch further includes one or more third portions that are cut from said one or more subsequent food items.

14. The method according to claim 13, wherein said one or more third portions are cut from the corresponding same or similar area of the one or more of subsequent food items as where the partial batch originates from.

15. The method according to claim 13, further comprising cutting said one or more of subsequent food items based on a processed measured image profile of said one or more of subsequent food items.

16. The method according to claim 13, further comprising creating a physical space between the first batch and said second portions of the cut food item that correspond to portions of the cut food item of the partial batch that do not fulfil said pre-defined batch criteria.

17. One or more non-transitory computer-readable mediums having stored thereon executable instructions that when executed by one or more processors configure a system for creating batches of food items conveyed by a conveyor to perform at least the following:
obtain a visual image of a food item with an image sensor,
store said obtained visual image,
measure the obtained and stored visual image to obtain a measured image profile for the food item,
process, with a computer system, the measured image profile for the food item, wherein the processing includes:
dividing the measured image profile of the food item into at least one batch fulfilling a pre-defined batch-criteria, wherein each of the at least one batch includes two or more portions each of which fulfil a pre-defined portion-criteria,
determining, based on said obtained and stored visual image, whether said dividing would yield a partial batch that does not fulfill the pre-defined batch-criteria, wherein in case a partial batch would be yielded from said dividing, determining and registering the number of portions within the partial batch that will fulfil the pre-defined portion-criteria, and
selecting an area within the food item where the partial batch would originate from based on the obtained and stored visual image,
cut the food item into a plurality of portions based on the processed measured image profile,
distinguish the portions within the partial batch from the remaining portions,
wherein the number of portions from one or more of subsequent food items needed to complete the partial batch such that it fulfils the pre-defined batch-criteria is taken from a corresponding same or similar area of the one or more of subsequent food items as where the partial batch originates from.

18. An apparatus for creating batches for food items conveyed by a conveyor, comprising:
an image sensor that obtains a visual image of a food item,
a memory storage that stores the obtained visual image,
a measurer that measures the obtained and stored visual image to obtain a measured image profile for the food item,
a processor that performs processing of the measured image profile for the food item, wherein the processing includes:
dividing the measured image profile of the food item into at least one batch fulfilling a pre-defined batch-criteria, wherein each of the at least one batch includes two or more portions each of which fulfil a pre-defined portion-criteria,
determining, based on said obtained and stored visual image, whether said dividing would yield a partial batch that does not fulfill the pre-defined batch-criteria, wherein in case a partial batch would be yielded from said dividing, determining and registering the number of portions within the partial batch that will fulfil the pre-defined portion-criteria, and
selecting an area within the food item where the partial batch would originate from based on the obtained and stored visual image, a cutting device for cutting the food item into a plurality of portions based on the processed measured image profile, a distinguisher that distinguishes the portions within the partial batch from the remaining portions, wherein the number of portions from one or more of subsequent food items needed to complete the partial batch such that it fulfils the pre-defined batch-criteria is taken from a corresponding same or similar area of the one or more of subsequent food items as where the partial batch originates from.

19. The apparatus according to claim 18, wherein the distinguisher comprises a separator that separates the portions within the partial batch from the remaining portions.

20. The apparatus according to claim 18, wherein the distinguisher comprises a spacer configured to create a space between the partial batch from the remaining batches so as to visually distinguishing the partial batch from the remaining batches.

* * * * *